United States Patent
Turakhia et al.

(10) Patent No.: US 9,469,721 B2
(45) Date of Patent: Oct. 18, 2016

(54) LOW EMISSION EPOXY CURING AGENTS

(71) Applicant: Blue Cube IP LLC, Midland, MI (US)

(72) Inventors: Rajesh H. Turakhia, Lake Jackson, TX (US); Larissa Falsarella, Rosharon, TX (US); Eva-Maria Michalski, Sinzheim (DE); Marcus Pfarherr, Mittelbiberach (DE); Carl J. Marshall, Jr., Macon, GA (US); Bill Z. Dellinger, Angleton, TX (US); Felipe A. Donate, Midland, MI (US)

(73) Assignee: BLUE CUBE IP LLC, Midland, MI (US)

( * ) Notice: Subject to any disclaimer, the term of this patent is extended or adjusted under 35 U.S.C. 154(b) by 0 days.

(21) Appl. No.: 14/439,594

(22) PCT Filed: Dec. 11, 2013

(86) PCT No.: PCT/US2013/074387
§ 371 (c)(1),
(2) Date: Apr. 29, 2015

(87) PCT Pub. No.: WO2014/099542
PCT Pub. Date: Jun. 26, 2014

(65) Prior Publication Data
US 2015/0315378 A1 Nov. 5, 2015

Related U.S. Application Data

(60) Provisional application No. 61/739,824, filed on Dec. 20, 2012.

(51) Int. Cl.
| | |
|---|---|
| *C08G 59/50* | (2006.01) |
| *C08K 5/06* | (2006.01) |
| *C08L 63/00* | (2006.01) |
| *C08L 63/02* | (2006.01) |
| *C09D 163/00* | (2006.01) |
| *C09J 163/00* | (2006.01) |
| *C04B 26/14* | (2006.01) |
| *C08K 5/00* | (2006.01) |

(52) U.S. Cl.
CPC ............... *C08G 59/50* (2013.01); *C04B 26/14* (2013.01); *C08G 59/502* (2013.01); *C08G 59/5006* (2013.01); *C08G 59/5026* (2013.01); *C08G 59/5033* (2013.01); *C08K 5/0016* (2013.01); *C08K 5/06* (2013.01); *C08L 63/00* (2013.01); *C09D 163/00* (2013.01); *C09J 163/00* (2013.01); *C08K 2201/014* (2013.01)

(58) Field of Classification Search
None
See application file for complete search history.

(56) References Cited

U.S. PATENT DOCUMENTS

| | | | |
|---|---|---|---|
| 5,463,091 A * | 10/1995 | Earls | C07D 303/22 528/101 |
| 5,746,935 A | 5/1998 | Corley et al. | |
| 2003/0119689 A1* | 6/2003 | Hutton | C11D 3/1266 510/218 |
| 2010/0004367 A1 | 1/2010 | Yano et al. | |
| 2011/0318494 A1 | 12/2011 | Donate et al. | |
| 2012/0142816 A1* | 6/2012 | Argyropoulos | C08G 59/5006 523/400 |

FOREIGN PATENT DOCUMENTS

| | | |
|---|---|---|
| EP | 533552 A1 * | 3/1993 |
| WO | WO 2010/051689 A1 * | 5/2010 |
| WO | 2014/099542 A1 | 6/2014 |

OTHER PUBLICATIONS

PCT/US20136/074387, International Search Report and Written Opinion, mailed Mar. 31, 2014.
PCT/US2013/074387, International Preliminary Report on Patentability, mailed Jul. 2, 2015.

* cited by examiner

*Primary Examiner* — Robert Sellers
(74) *Attorney, Agent, or Firm* — Polsinelli PC

(57) ABSTRACT

A hardener composition comprising: a) an amine component; and b) a glycol ether component comprising i) from 10 weight percent to 70 weight percent alkylene glycol phenyl ether; ii) from 25 weight percent to 80 weight percent dialkylene glycol phenyl ether; iii) from 5 weight percent to 20 weight percent trialkylene glycol phenyl ether, is disclosed. The hardener composition can be used in epoxy thermoset formulations.

19 Claims, No Drawings

LOW EMISSION EPOXY CURING AGENTS

FIELD

The present invention is related to epoxy thermoset formulations or compositions. More particularly, the present invention is related to plasticizers for epoxy thermoset formulations.

INTRODUCTION

Benzyl alcohol (BA) and nonylphenol (NP) have long been used as plasticizers in epoxy thermoset formulations. They are commonly added to amine hardeners to lower the viscosity and increase the reactivity of the thermoset formulations. The addition of plasticizers like nonylphenol and benzyl alcohol plays an important role in ambient cure applications by lowering the glass transition (Tg) temperatures of thermoset formulations, reduce viscosity, and accelerate the curing process thereby making them more suitable for ambient cure applications. Volatile organic compounds (VOCs), are emitted as gases from industrial and consumer coatings products. Both industry and government standards strive to reduce environmental and human exposure to these harmful compounds. However, because of its high vapor pressure, benzyl alcohol is treated unfavorably under certain VOC regulations such as the Decopaint Directive in Europe, which defines a VOC as an organic compound having an initial boiling point lower than or equal to 250° C. at an atmospheric pressure of 101.3 kPa. Other regulations, such as the European Eco-Labeling scheme (2002/739/EC amending 1999/10/EC) also have restricted the usage of benzyl alcohol. In the United States, the presence of benzyl alcohol in epoxy formulations also contributes to VOC by EPA Method 24 (Determination of volatile matter content, water content, density, volume solids, and weight solids of surface coatings).

Nonylphenol (NP) is considered to be an endocrine disruptor due to its ability to mimic estrogen. In Europe, NP is labeled with R62 classification (possible risk of impaired fertility) and R63 (possible risk of harm to the unborn child). In the United States, the EPA released an action plan addressing NP and nonylphenol ethoxylates (NPEs) encouraging manufacturers of all NPE-containing direct-release products to move to NPE-free formulations.

Therefore, there is a need for next generation of hardeners formulated without benzyl alcohol or nonylphenol.

SUMMARY

One broad aspect of the present invention is a hardener composition comprising, consisting of, or consisting essentially of: a) an amine component; and b) a glycol ether component. The glycol ether component comprises i) from 10 weight percent to 70 weight percent alkylene glycol phenyl ether; ii) from 25 weight percent to 80 weight percent dialkylene glycol phenyl ether; and iii) from 5 weight percent to 20 weight percent trialkylene glycol phenyl ether, based on the total weight of the glycol ether component.

In another embodiment of the present invention, there is disclosed an epoxy thermoset composition comprising, consisting of or consisting essentially of a) an epoxy resin; b) an amine component, c) the above-described glycol ether component; and d) a catalyst.

DETAILED DESCRIPTION

Epoxy Resin

Any suitable aromatic epoxy resin such as a mono-, di-, tri-, poly-, glycidyl ether of bisphenol A or a mono-, di-, tri-, poly-, glycidyl ether of bisphenol F can be used in the thermoset composition. Examples of epoxy resins include, but are not limited to liquid epoxy resins (LER) such as for example D.E.R.™ 383, D.E.R.™ 331, and D.E.R.™ 354, ('D.E.R.' is a trademark of The Dow Chemical Company). The epoxy resin can also be a epoxy resin blend comprising (i) an epoxy resin such as D.E.R.™ 383, or D.E.R.™ 331, or D.E.R.™ 354, and (ii) mono-, di-, tri-, and poly-glycidyl ethers of aliphatic epoxy resins, monoglycidyl ethers of aromatic epoxy resins, and iii) other reactive and non-reactive diluents. Examples of these are D.E.R.™ 736, D.E.R.™ 732, cresyl glycidyl ether, diglycidyl ether of aniline, alkyl ($C_{12}$-$C_{14}$) monoglycidyl ether, 1,4-butanediol diglycidyl ether, 1,6-hexanediol diglycidyl ether, 2-ethylhexyl glycidyl ether, neopentyl glycol diglycidyl ether, trimethylolpropane triglycidyl ether, and hydrocarbon resins. Mixtures of two or more aromatic epoxy resins can also be used.

Hardener

Amine Component

The hardener contains an amine component or a mixture of amine components used for epoxy thermoset applications. Examples of the amine component include, but are not limited to liquid aromatic amines, aliphatic amines, cycloaliphatic amines, amidoamines, polyamides, and solid amines dissolved in a solvent. Suitable amines include diethylenetriamine, triethylenetetramine, tetraethylenepentamine, bis(2-(piperazin-1-yl))ethyl amine, poly(oxypropylene diamine), poly(oxypropylene triamine), poly(glycol amine), N-aminoethylpiperazine, isophorone diamine, 1,2 diaminocyclohexane, bis(4-aminocyclohexyl) methane, 4,4'-diamino-diphenylmethane, 4,4'-diaminodiphenylsulfone, m-phenylenediamine, diethyltotulenediamine, meta-xylene diamine, 1,3-bis(aminomethyl cyclohexane), 1,4-bis (aminomethyl cyclohexane), polyetheramines, and combinations thereof. The amine component may also be an epoxy adduct of any of the amines but not limited to those described in the list above.

The amine component is generally present in the hardener composition in the range of from 25 weight percent to 90 weight percent, based on the total weight of the hardener composition. The amine component can be present in the hardener composition in the range of from 50 weight percent to 80 weight percent in another embodiment, and can be present in the range of from 40 weight percent to 60 weight percent in yet another embodiment.

Glycol Ether Component

The hardener composition further comprises a glycol ether component. In an embodiment, the glycol ether component is alkylene glycol phenyl ether. The alkylene glycol phenyl ether is represented by the following Formula I:

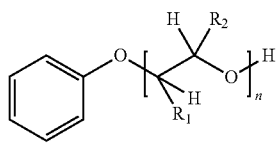

Formula I wherein both R1 and R2 can be hydrogen atoms or alternatively, R1 can be hydrogen and R2 can be methyl or vice versa, and n can range from 1 to 8.

In an embodiment, the glycol ether component may contain an alkylene glycol phenyl ether, a dialkylene glycol phenyl ether, and a trialkylene glycol phenyl ether. The alkylene glycol phenyl ether can be selected from the group consisting of ethylene glycol phenyl ether and propylene glycol phenyl ether, the dialkylene glycol phenyl ether can be selected from diethylene glycol phenyl ether and dipropylene glycol phenyl ether, and the trialkylene glycol phenyl ether can be selected from the group consisting of triethylene glycol phenyl ether and tripropylene glycol phenyl ether. In an embodiment, the glycol ether comprises a polyalkylene glycol phenyl ether with a number average molecular weight of from 300 to 400 daltons.

In an embodiment, the glycol ether component can comprise from 10 weight percent to 70 weight percent alkylene glycol phenyl ether, from 25 weight percent to 80 weight percent dialkylene glycol phenyl ether, and from 5 weight percent to 20 weight percent trialkylene glycol phenyl ether. In another embodiment, the alkylene glycol phenyl ether is present in an amount in the range of from 15 weight percent to 25 weight percent, the dialkylene glycol phenyl ether is present in an amount in the range of from 60 weight percent to 75 weight percent; and the trialkylene glycol phenyl ether is present in an amount in the range of from 5 weight percent to 20 weight percent. In yet another embodiment, the alkylene glycol phenyl ether is present in an amount of 70 weight percent, the dialkylene glycol phenyl ether is present in an amount in the range of from 25 weight percent to 27 weight percent; and the trialkylene glycol phenyl ether is present in an amount in the range of from 3 weight percent to 5 weight percent.

Optionally, the glycol ether component can contain ethoxylated ortho/para-hydroxyphenethyl alcohols and/or propoxylated ortho/para hydroxyl-methylphenethyl alcohols. In an embodiment, ethoxylated ortho/para-hydroxyphenethyl alcohols are present in an amount in the range of from 1 weight percent to 10 weight percent and can be present in an amount in the range of from 5 weight percent to 10 percent in another embodiment. In an embodiment, propoxylated ortho/para-hydroxy-methylphenethyl alcohols are present in an amount in the range of from 1 weight percent to 10 weight percent, based on the total weight of the glycol ether component.

The glycol ether component is generally present in the hardener composition in the range of from 10 weight percent to 75 weight percent, based on the total weight of the hardener composition. The glycol ether component can be present in the range of from 20 weight percent to 60 weight percent in another embodiment, and is present in the range of from 40 weight percent to 60 weight percent in yet another embodiment.

Catalyst

The thermoset composition further contains a catalyst or a mixture of catalysts. Catalysts may include but are not limited to salicylic acid, bisphenol A, 2,4,6,-tris(dimethylaminomethyl)phenol (DMP-30), imidazole derivates, p-tolunesulfonic acid, methy p-toluenesulfonate, and phenol derivatives. The catalyst can be added to the thermoset formulation by adding it to the epoxy component, or by adding it to the hardener component, or by adding it directly to the thermoset composition.

The catalyst is generally present in the thermoset composition in an amount in the range of from 0.2 weight percent to 12 weight percent, based on the total weight of the thermoset composition.

Process for Producing the Hardener Composition

Any suitable method can be used to produce the hardener composition. In an embodiment, the amine or a mixture of amines is added to a reactor at room temperature. In embodiments where an epoxy adduct of the amine is desired, an epoxy resin is also added to the reactor and is mixed for a period of time to facilitate the reaction between the epoxy and the amine. In an embodiment, the epoxy and amine are mixed for one hour at a temperature of 80° C. Subsequently, the glycol ether component is added to the amine component. In an embodiment, a catalyst and/or other optional components described above are also added to the reactor. The mixture is stirred and can also be heated to a temperature up to 80° C. in some embodiments, until a clear solution of the final hardener formulation is obtained.

Optional Components

Other optional components that can be added to the epoxy thermoset composition include formulation additives, fillers, pigments, toughening agents, and additional plasticizers.

Process for Producing the Epoxy Thermoset Composition

In an embodiment, the curable composition can be prepared by admixing an epoxy resin with the amine component, the glycol ether component, and a catalyst or a mixture of catalysts. In an embodiment, any of the optional components described above can be added to the admixture. The admixing can be done in any order, and in any combination or sub-combination. Optionally the catalyst can be pre-added to the epoxy resin component or to any component of the hardener.

Epoxy resins are formulated with the hardener composition at an epoxide to amine hydrogen equivalent ratio in the range of from 0.5 to 1.5 in an embodiment, from 0.7 to 1.3 in another embodiment, and from 0.95 to 1.05 in yet another embodiment.

In an embodiment, the composition is cured at a temperature in the range of from 0° C. to 200° C.

End Use Applications

Epoxy thermoset formulations containing the hardener composition of the present invention can be used in any application where low VOC, or low emission values are required. Examples include but are not limited to coatings, composites, adhesives, mortars, and other infrastructure and civil engineering applications. These formulations can be applied to substrates including but not limited to metal, concrete, fiber glass fibers, and carbon fibers.

Vapor Pressure

Vapor pressure is the pressure exerted by a vapor in thermodynamic equilibrium with its condensed phases (solid or liquid) at a given temperature in a closed system. The vapor pressure is an indication of a liquid's evaporation rate. It relates to the tendency of particles to escape from the liquid (or a solid). A substance with a high vapor pressure at normal temperatures is often referred to as volatile.

Table 1 shows the vapor pressure of alkylene glycol phenyl ethers. Table 2 shows the vapor pressure of some of the common commercial glycol ethers and also of benzyl alcohol. The vapor pressures of diethylene glycol ether, triethylene glycol ether, dipropylene glycol ether, tripropylene glycol ether are significantly lower than the vapor pressures of comparative glycol ethers and benzyl alcohol and hence less volatile than the comparative glycol ethers and benzyl alcohol. In an embodiment, the glycol ether component of the present invention has a vapor pressure of less than 0.004 mm Hg at 20° C.

TABLE 1

Vapor pressure of Alkylene Glycol Phenyl Ethers

| Alkylene Glycol Phenyl Ethers | Vapor Pressure (mm Hg @ 20° C.) |
| --- | --- |
| Ethylene Glycol Phenyl Ether | 0.004 |
| Diethylene Glycol Phenyl Ether | 0.000147 |

TABLE 1-continued

Vapor pressure of Alkylene Glycol Phenyl Ethers

| Alkylene Glycol Phenyl Ethers | Vapor Pressure (mm Hg @ 20° C.) |
|---|---|
| Triethylene Glycol Phenyl Ether | 0.000005 |
| Mixture - 15% Ethylene glycol phenyl ether:70% Diethylene glycol phenyl ether:15% 15% Triethylene glycol phenyl ether | 0.000402 |
| Propylene Glycol Phenyl Ether | 0.01 |
| Mixture - 10% Propylene glycol phenyl ether:80% Dipropylene glycol phenyl ether:10% Tripropylene glycol phenyl ether | 0.000356 |
| Dipropylene Glycol Phenyl Ether | 0.000642 |
| Tripropylene Glycol Phenyl Ether | 0.000015 |

TABLE 2

Vapor pressure of Comparative Glycol Ethers and Benzyl Alcohol

| Comparitive Glycol Ethers | Vapor Pressure (mm Hg @ 20° C.) |
|---|---|
| Diethylene Glycol Monobutyl Ether | <0.01 |
| Diethylene Glycol n-butyl Ether Acetate | <0.01 |
| Ethylene Glycol Monobutyl Ether | 0.66 |
| Ethylene Glycol n-butyl Ether Acetate | 0.6 |
| Diethylene Glycol Monoethyl Ether | 0.09 |
| Propylene Glycol Methyl Ether | 8.7 |
| Propylene Glycol Methyl Ether Acetate | 2.8 |
| Dipropylene Glycol Methyl Ether | 0.28 |
| Dipropylene Glycol Methyl Ether Acetate | 0.08 |
| Tripropylene Glycol Methyl Ether | 0.01 |
| Triethylene Glycol Monoethyl Ether | <0.01 |
| Triethylene Glycol Monomethyl Ether | 0.008 |
| Diethylene Glycol Monomethyl Ether | 0.09 |
| Propylene Glycol n-Butyl Ether | 0.85 |
| Dipropylene Glycol n-Butyl Ether | 0.04 |
| Tripropylene Glycol n-Butyl Ether | 0.002 |
| Propylene Glycol n-Propyl Ether | 1.5 |
| Dipropylene Glycol n-Propyl Ether | 0.08 |
| Ethylene Glycol Monohexyl Ether | 0.038 |
| Diethylene Glycol Monohexyl Ether | 0.001 |
| Ethylene Glycol Monopropyl Ether | 1.6 |
| Benzyl Alcohol | 0.03 |

EXAMPLES

Materials

D.E.R.™ 331—bisphenol A liquid epoxy resin, available from the Dow Chemical Company Isophoronediamine (IPDA) from Evonik Corporation 1,3-bisaminecyclohexane (1,3-BAC) from Mitsubishi Chemicals Aminoethylpiperazine (AEP) from The Dow Chemical Company Nonylphenol from SI group Test Methods

VOC

VOC was measured by EPA Method 24 (Determination of volatile matter content, water content, density, volume solids, and weight solids of surface coatings).

Gel Time

Gel time was determined by ASTM D 2471 on a Gardner Gel Timer. The formulation (100 grams) was mixed one minute with a tongue depressor, and then placed on the gel time unit.

Dry Film Time (DFT) Test

Dry times were determined by ASTM D 5895 using a BYK dry time recorder at the 48 hour speed setting. The test room temperature was 23° C. The end of the third stage was reported as the dust free time and the point at which the needle no longer penetrated the film was reported as the dry through time.

Shore D Hardness

Shore D Hardness was measured by ASTM D2240 using a PTC Instruments Type D Durometer, model 307L. The shore-D hardness specimen was checked for hardness once sufficiently cured to a solid state and then at time intervals e.g. 24 hours, 48 hours, etc. until no further increase was observed.

Blush

Blush was measured by qualitatively evaluating the dry film. Minimal blush refers to no oily film formation and high blush refers to high oil formation on the film.

Pendulum Hardness

Pendulum Hardness was measured according to ASTM D4366—Standard Test Methods for Hardness of Organic Coatings by Pendulum Damping Tests. The higher the hardness number, the better the hardness.

Cross Hatch Adhesion

Cross Hatch Adhesion was measured according to ASTM D3359—Standard Test Methods for Measuring Adhesion by Tape Test. The hardness scale is from 1B to 5B with 5B being the best.

Examples 1, 2 and Comparative Example A

Table 3 describes the hardener compositions in Examples 1 and 2 along with Comparative Example A. Hardeners were prepared by mixing all the components listed for the various examples at 60° C.

In Example 1 and Example 2, both benzyl alcohol and nonylphenol were replaced by alkylene glycol phenyl ether. The amine hydrogen equivalent (AHEW) and viscosity are also shown for all the examples and the comparative example A.

TABLE 3

Hardener Compositions

| Raw Materials | Comparative Example A weight % | Example 1 weight % | Example 2 weight % |
|---|---|---|---|
| IPDA | 20.0 | 19.8 | 19.8 |
| Nonylphenol | 19.0 | 0.0 | 0.0 |
| Benzyl alcohol | 27.0 | 0.0 | 0.0 |
| D.E.R.* 331 | 12.0 | 10.5 | 10.5 |
| 1,3-BAC | 13.9 | 13.9 | 13.9 |
| AEP | 8.0 | 8.0 | 8.0 |
| salicylic acid |  | 3.0 | 3.0 |
| Ethylene Glycol Phenyl Ether |  | 31.4 | 6.7 |
| Diethylene Glycol Phenyl Ether |  | 11.6 | 31.4 |
| Triethylene Glycol Phenyl Ether |  | 1.8 | 6.7 |
| Total | 100 | 100 | 100 |
| AHEW | 95 | 96 | 96 |
| Viscosity (mPa · s @ 25° C.) | 620 | 720 | 650 |

Thermoset Formulations

Formulations for thermoset evaluations for the Examples 1 and 2 and Comparative Examples were prepared using D.E.R.™ 331 (EEW 188 g/eq) and the hardener at a 1 to 1 epoxy to amine hydrogen (NH) equivalent ratio. Formulations (30 grams) were mixed using a Flack Tek mixer for 0.5 minute at 800 rpm followed by 2 minutes at 2400 rpm, then the mixture was transferred to a glass jar and centrifuged for 5 minutes at 2500 rpm. The time between mixing and applying the drawdowns was 10-15 minutes, which included the centrifuge time. For each formulation, a 150 mil drawdown on a glass slide was made for dry film time (DFT) testing, and two drawdowns with a 10 mil drawdown bar were made on phosphatized steel Q-panels (12 inch×4 inch) for gloss measurement, conical mandrel bend, and cross hatch adhesion. In addition, 13 grams of formulation was poured into a small aluminum pan for shore-D hardness development testing. All the coating drawdowns were cured for 7 days at ambient (23° C.) prior to testing, except for the DFT test which was put on the DFT recorder right away.

The thermoset formulation details and the physical and coating properties of these three compositions are shown in Table 4, below. The properties of examples 1 and 2 are similar to or better than those of Comparative Example A. The volatile organic compound (VOC) content of examples 1 and 2 were lower than the comparative example A. The VOC content of comparative example A was 21 g/l and the VOC content of examples 1 and 2 were 17 g/l and 9 g/l, respectively. There was also no blush observed with Examples 1 and 2.

TABLE 4

Epoxy Thermoset Formulations and Properties

| | Comparative Formulation A weight % | Formulation 1 weight % | Formulation 2 weight % |
|---|---|---|---|
| D.E.R. 331 | 66 | 66 | 66 |
| Hardener Composition comparative Example A | 34 | 0 | 0 |
| Hardener Composition Example 1 | 0 | 34 | 0 |
| Hardener Composition Example 2 | 0 | 0 | 34 |
| Properties | | | |
| VOC: 1 hr induction then 1 hr @ 110° C. (g/L) | 21 | 17 | 9 |
| Gel time of 100 g (min) | 21 | 36 | 27 |
| Dry Time (TFST) - Dust free (hr) | 3.5 | 6 | 5 |
| Dry Time (TFST) - Dry through (hr) | >24 | >24 | >24 |
| Blush (24 hr @ room temperature) | None | None | None |
| Shore D Hardness 8 h | 70 | 50 | 70 |
| Shore D Hardness 16 h | 80 | 75 | 78 |
| Shore D Hardness 24 h | 82 | 80 | 80 |
| Shore D Hardness 7 days | 80 | 80 | 80 |
| Pendulum Hardness 7 days @ room temperature | 103 | 92 | 114 |
| Cross Hatch Adhesion 7 days @ room temperature | 2B | 4B | 4B |

Examples 3, 4, and Comparative Example B

Table 5 describes the hardener compositions Examples 3 and 4 along with the Comparative Example B. Hardeners were prepared by mixing all the components at 60° C. In Examples 3 and 4, benzyl alcohol was replaced by glycol ethers.

TABLE 5

Hardener Compositions

| Raw materials | Comparative Example B weight % | Example 3 weight % | Example 4 weight % |
|---|---|---|---|
| IPDA | 41 | 39.2 | 39.2 |
| Benzyl alcohol | 44 | 0 | 0 |
| Ethylene Glycol Phenyl Ether | 0 | 0 | 7.2 |
| Diethylene Glycol Phenyl Ether | 0 | 0 | 33.5 |
| Triethylene Glycol Phenyl Ether | 0 | 0 | 7.2 |
| Polyethylene Glycol Phenyl Ether (Average molecular weight = 325) | 0 | 47.83 | 0 |
| Salicylic acid | 0 | 5.97 | 6 |
| D.E.R. 331 | 15 | 7 | 7 |
| Total | 100 | 100 | 100 |
| Amine Hydrogen Equivalent Weight (AHEW) | 113 | 113 | 113 |
| Viscosity (mPa · s @ 25° C.) | 330 | 1000 | 1075 |

The thermoset formulation details and the physical and coating properties of these three compositions are shown in Table 6, below. The properties of Examples 3 and 4 are similar to or better than the Comparative Example B. The volatile organic compound (VOC) content of Examples 3 and 4 were significantly lower than that of comparative example B. The VOC content of Comparative Example B was 45 g/l and the VOC content of Examples 3 and 4 were 3 g/l and 11 g/l, respectively. There was also no blush observed with Examples 3 and 4. The Shore D hardness development of the coating from Comparative Example B was softer after 8 hours as compared to the coatings of Examples 3 and 4.

TABLE 6

Epoxy Thermoset Formulations and Properties

| | Comparative Formulation B weight % | Formulation 3 weight % | Formulation 4 weight % |
|---|---|---|---|
| D.E.R. 331 | 62 | 62 | 62 |
| Hardener Composition comparative Example B | 38 | 0 | 0 |
| Hardener Composition Example 3 | 0 | 38 | 0 |
| Hardener Composition Example 4 | 0 | 0 | 38 |
| Properties | | | |
| VOC: 1 hr induction then 1 hr @ 110° C. (g/L) | 45 | 3 | 11 |
| Gel time of 100 g (min) | 43 | 63 | 36 |
| Dry Time (TFST) - Dust free (hr) | 5.5 | 8 | 8 |
| Dry Time (TFST) - Dry through (hr) | 8.5 | >24 | >24 |
| Blush (24 hr @ room temperature) | slight | None | None |
| Shore D Hardness 8 h | soft | 15 | 30 |
| Shore D Hardness 16 h | 60 | 60 | 75 |
| Shore D Hardness 24 h | 74 | 70 | 80 |
| Shore D Hardness 7 days | 76 | 72 | 80 |
| Pendulum Hardness 7 days @ room temperature | | 102 | 104 |
| Cross Hatch Adhesion 7 days @ room temperature | 3B | 3B | 3B |

The invention claimed is:
1. A hardener composition comprising:
 a) an amine component; and
 b) a glycol ether component comprising
  i) from 10 weight percent to 70 weight percent alkylene glycol phenyl ether;
  ii) from 25 weight percent to 80 weight percent dialkylene glycol phenyl ether; and iii) from 5 weight percent to 20 weight percent trialkylene glycol phenyl ether, based on the total weight of the glycol ether component.

2. A hardener composition in accordance with claim 1 wherein said alkylene glycol phenyl ether is selected from the group consisting of ethylene glycol phenyl ether and propylene glycol phenyl ether, said dialkylene glycol phenyl ether is selected from diethylene glycol phenyl ether and dipropylene glycol phenyl ether, and said trialkylene glycol phenyl ether is selected from the group consisting of triethylene glycol phenyl ether and tripropylene glycol phenyl ether.

3. A hardener composition in accordance with claim 1 wherein said glycol ether component has a vapor pressure of less than 0.004 mm Hg at 20° C.

4. A hardener composition in accordance with claim 1 wherein said glycol ether component comprises i) 70 weight percent ethylene glycol phenyl ether; ii) from 25 weight percent to 27 weight percent diethylene glycol phenyl ether; and iii) from 3 weight percent to 5 weight percent triethylene glycol phenyl ether, based on the total weight of said glycol ether component.

5. A hardener composition in accordance with claim 1 wherein said glycol ether component comprises i) from 15 weight percent to 25 weight percent ethylene glycol phenyl ether; ii) from 60 weight percent to 75 weight percent diethylene glycol phenyl ether; and iii) from 5 weight percent to 20 weight percent triethylene glycol phenyl ether, based on the total weight of said glycol ether component.

6. A hardener composition in accordance with claim 1 wherein the glycol ether component comprises a polyalkylene glycol phenyl ether with a number average molecular weight of from 300 daltons to 400 daltons.

7. A hardener composition in accordance with claim 1 wherein said amine component is selected from the group consisting of isophorone diamine, diethylenetriamine, triethylenetetramine, tetraethylenepentamine, poly(oxypropylene diamine), meta-xylene diamine, and combinations thereof.

8. A hardener composition in accordance with claim 1 wherein said amine component is present in an amount in the range of from 25 weight percent to 90 weight percent and said glycol ether component is present in an amount in the range of from 10 weight percent to 75 weight percent, based on the total weight of the hardener composition.

9. A thermoset composition comprising:
a) an epoxy resin;
b) an amine component;
c) a glycol ether component comprising
  i) from 10 weight percent to 70 weight percent alkylene glycol phenyl ether;
  ii) from 25 weight percent to 80 weight percent dialkylene glycol phenyl ether; and
  iii) from 5 weight percent to 20 weight percent trialkylene glycol phenyl ether, based on the total weight of the glycol ether component; and
d) a catalyst.

10. A thermoset composition in accordance with claim 9 wherein the thermoset composition has an epoxide to amine hydrogen equivalent ratio in the range of from 0.5 to 1.5.

11. A thermoset composition in accordance to claim 9 wherein the catalyst is present in an amount in the range of from 0.2 weight percent to 12 weight percent, based on the total weight of the composition.

12. A thermoset composition in accordance with claim 9 wherein said alkylene glycol phenyl ether is selected from the group consisting of ethylene glycol phenyl ether and propylene glycol phenyl ether, said dialkylene glycol phenyl ether is selected from diethylene glycol phenyl ether and dipropylene glycol phenyl ether, and said trialkylene glycol phenyl ether is selected from the group consisting of triethylene glycol phenyl ether and tripropylene glycol phenyl ether.

13. A thermoset composition in accordance with claim 9 wherein said glycol ether component has a vapor pressure of less than 0.004 mm Hg at 20° C.

14. A thermoset composition in accordance with claim 9 wherein said glycol ether component comprises i) 70 weight percent ethylene glycol phenyl ether; ii) from 25 weight percent to 27 weight percent diethylene glycol phenyl ether; and iii) from 3 weight percent to 5 weight percent triethylene glycol phenyl ether, based on the total weight of said glycol ether component.

15. A thermoset composition in accordance with claim 9 wherein said glycol ether component comprises i) from 15 weight percent to 25 weight percent ethylene glycol phenyl ether; ii) from 60 weight percent to 75 weight percent diethylene glycol phenyl ether; iii) from 5 weight percent to 20 weight percent triethylene glycol phenyl ether, based on the total weight of said glycol ether component.

16. A thermoset composition in accordance with claim 9 wherein said amine component is selected from the group consisting of isophorone diamine, diethylenetriamine, triethylenetetramine, tetraethylenepentamine, poly(oxypropylene diamine), meta-xylene diamine, and combinations thereof.

17. A thermoset composition in accordance with claim 9 wherein said catalyst is salicylic acid.

18. A thermoset composition in accordance with claim 9 further comprising e) a toughening agent.

19. An article prepared from the thermoset composition of claim 9, wherein said article is selected from the group consisting of a composite, a coating, an adhesive, and a mortar.

* * * * *